(12) United States Patent
Reial (10) Patent No.: US 8,855,172 B2
(45) Date of Patent: Oct. 7, 2014

(54) NON-REDUNDANT EQUALIZATION

(75) Inventor: Andres Reial, Malmö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 384 days.

(21) Appl. No.: 13/316,084

(22) Filed: Dec. 9, 2011

(65) Prior Publication Data

US 2013/0148699 A1 Jun. 13, 2013

(51) Int. Cl.
*H04B 1/709* (2011.01)

(52) U.S. Cl.
USPC ............ 375/150; 375/148; 375/147; 375/139; 375/130

(58) Field of Classification Search
USPC ..................... 375/150, 148, 147, 139, 130
See application file for complete search history.

(56) References Cited

U.S. PATENT DOCUMENTS

| | | | |
|---|---|---|---|
| 6,480,526 B1 * | 11/2002 | Shoki et al. ............... | 375/147 |
| 7,933,345 B2 | 4/2011 | Fulghum et al. | |
| 2005/0201447 A1 * | 9/2005 | Cairns et al. ............... | 375/148 |
| 2006/0007990 A1 | 1/2006 | Cozzo et al. | |
| 2006/0171451 A1 | 8/2006 | Pietraski et al. | |
| 2006/0251156 A1 * | 11/2006 | Grant et al. ............... | 375/148 |
| 2007/0165735 A1 | 7/2007 | Pan et al. | |
| 2008/0152053 A1 * | 6/2008 | Fulghum et al. ........... | 375/347 |
| 2008/0205562 A1 | 8/2008 | Jonsson et al. | |
| 2010/0020854 A1 | 1/2010 | He et al. | |
| 2010/0260237 A1 | 10/2010 | Jonsson | |

FOREIGN PATENT DOCUMENTS

| | | |
|---|---|---|
| EP | 1022862 A2 | 7/2000 |
| GB | 2384664 A | 7/2003 |
| WO | 2005096518 A1 | 10/2005 |
| WO | 2007015581 A1 | 10/2007 |
| WO | 2008141991 A1 | 11/2008 |
| WO | 2008154653 A2 | 12/2008 |
| WO | 2010023530 A2 | 3/2010 |

OTHER PUBLICATIONS

Shakya, I., et al., Blind Adaptive Successive Interference Cancellation for Multicarrier DS-CDMA, Submitted Feb. 26, 2011, retrieved Oct. 2, 2013, retrieved from interned: http://arxiv.org/abs/1102.5442.

* cited by examiner

*Primary Examiner* — Michael Neff
(74) *Attorney, Agent, or Firm* — Coats & Bennett, PLLC (57) ABSTRACT

Communication signal processing entails generating an overall signal correlation estimate that reflects overall impairment present in a received signal before despreading. Processing further includes parametrically constructing one or more component-specific correction terms as a function of one or more component signal correlation estimates, each estimate reflecting a particular component of the overall impairment. Combining weights are derived, as a function of this overall estimate and the correction term(s), so that they exclude the contribution of the impairment component(s) to the overall impairment. These weights are used to combine signal samples in an equalization process. As the combining weights exclude the contribution of the impairment component(s) to the overall impairment, the equalization process utilizing the weights exclusively suppresses impairment that is not attributable to the component(s). This advantageously avoids redundant suppression of the impairment component(s), since processing further includes despreading the received signal in a despreading process that suppresses the component(s).

20 Claims, 6 Drawing Sheets

NON-REDUNDANT EQUALIZATION

TECHNICAL FIELD

The present invention generally relates to communication signal processing, and particularly relates to processing a received communication signal using an equalization process.

BACKGROUND

Direct-sequence (DS) spread-spectrum modulation is commonly used in wireless communication systems based on code-division multiple-access (CDMA), where each information symbol is represented by a number of "chips." Representing one symbol by many chips gives rise to "spreading," as the latter typically requires more bandwidth to transmit. The sequence of chips is referred to as the spreading code. At the receiver, the received signal is despread using a despreading code, which is typically the conjugate of the spreading code.

Interference and noise are the main signal impairments affecting receiver performance in DS-CDMA systems. Interference, in particular, is a combination of many components, including: self-interference, such as inter-symbol interference (ISI); multiple access interference, i.e., interference due to non-zero code cross-correlation; interference from other cells in the downlink; or interference from other users in the uplink. These impairment components must be suppressed at the receiver in order to achieve good throughput of the system.

One promising approach to suppressing impairment is linear equalization. Linear equalization can be performed either before despreading (referred to as chip-level equalization) or after despreading (referred to as symbol-level equalization). In symbol-level equalization, the received chip-level data is despread at multiple delays, and then the multiple signal images are weightedly combined. Chip-level equalization reverses the order of these operations. The received chip data is first weightedly combined using a linear filter and then despread at a single delay. Under most circumstances, symbol-level and chip-level equalization provide equivalent performance Where the combining weights are computed based on signal characteristics, e.g. a signal or impairment covariance matrix, those weights may be estimated from either the chip-level or despread versions of the signal. In some scenarios, the combining weights computed from symbol-level signal characteristics are simply scaled versions of the combining weights computed from chip-level signal characteristics. Combining weight computation may therefore be conceptually separated from combining weight application, since, if desired, the weights could be computed at the chip-level, scaled, and then applied in a symbol-level equalization process.

Some contexts, however, threaten this relationship between chip-level and symbol-level equalization weight computation and otherwise threaten the ability of combining weights actually computed at the chip-level to provide the same level of equalization performance as that of combining weights actually computed at the symbol-level. In one such context, spreading codes associated with different impairment components are correlated with the spreading code of a desired component to different degrees, meaning that the despreading process affects different impairment components differently.

SUMMARY

As a general proposition, teachings herein advantageously compute combining weights at the chip-level so that they do not attempt to suppress impairment components that will be suppressed by the despreading process itself. Exploiting knowledge of the despreading process in this way, the equalization process utilizing these combining weights refrains from redundant impairment suppression and consequently more effectively suppresses other impairment components.

More particularly, communication signal processing herein entails generating an overall signal correlation estimate that reflects overall impairment present in a received signal before despreading. The overall impairment as used herein refers to the combined effects of all types or components of impairment in the received signal. Processing further includes parametrically constructing one or more component-specific correction terms as a function of one or more component signal correlation estimates, where each component signal correlation estimate reflects a particular component of the overall impairment present in the received signal before despreading.

Combining weights are then derived, as a function of the overall signal correlation estimate and the one or more component-specific correction terms, so that they exclude the contribution of these one or more impairment components to the overall impairment. These weights are used to combine signal samples in a chip-level or symbol-level equalization process. As the combining weights exclude the contribution of the one or more impairment components to the overall impairment, the equalization process utilizing the weights exclusively suppresses impairment that is not attributable to those components. This avoids redundant suppression of these impairment components, since processing further includes despreading the received signal in a despreading process that suppresses these components.

In some embodiments, the correction terms mentioned above represent parametrically constructed impairment correlations associated with the particular impairment components that will be removed by the despreading process. In this case, the combining weights utilized by the equalization process are derived by removing the one or more correction terms from the overall signal correlation estimate, to form a partial signal correlation estimate. This partial signal correlation estimate thus reflects only partial impairment present in the signal before despreading—namely, impairment components other than those which are to be suppressed by the despreading process. The weights are then computed from the partial signal correlation estimate, rather than from the overall signal correlation estimate as is conventional.

In other embodiments, the correction terms represent weight adjustment values that functionally multiply initial weights computed from the overall signal correlation estimate to remove the contribution that particular impairment components provided to those initial weights. More specifically, initial weights are computed from the overall signal correlation estimate, as is convention. But, those initial weights are multiplied by the one or more correction terms in order to derive the weights actually used for equalization. Applying the one or more correction terms in this way to the initial weights effectively eliminates (at least substantially) the contribution that the one or more particular impairment components provided to those initial weights. This way, the resulting weights do not attempt to suppress those impairment components.

Of course, the present invention is not limited to the above features and advantages. Indeed, those skilled in the art will

DETAILED DESCRIPTION

Figure 1:
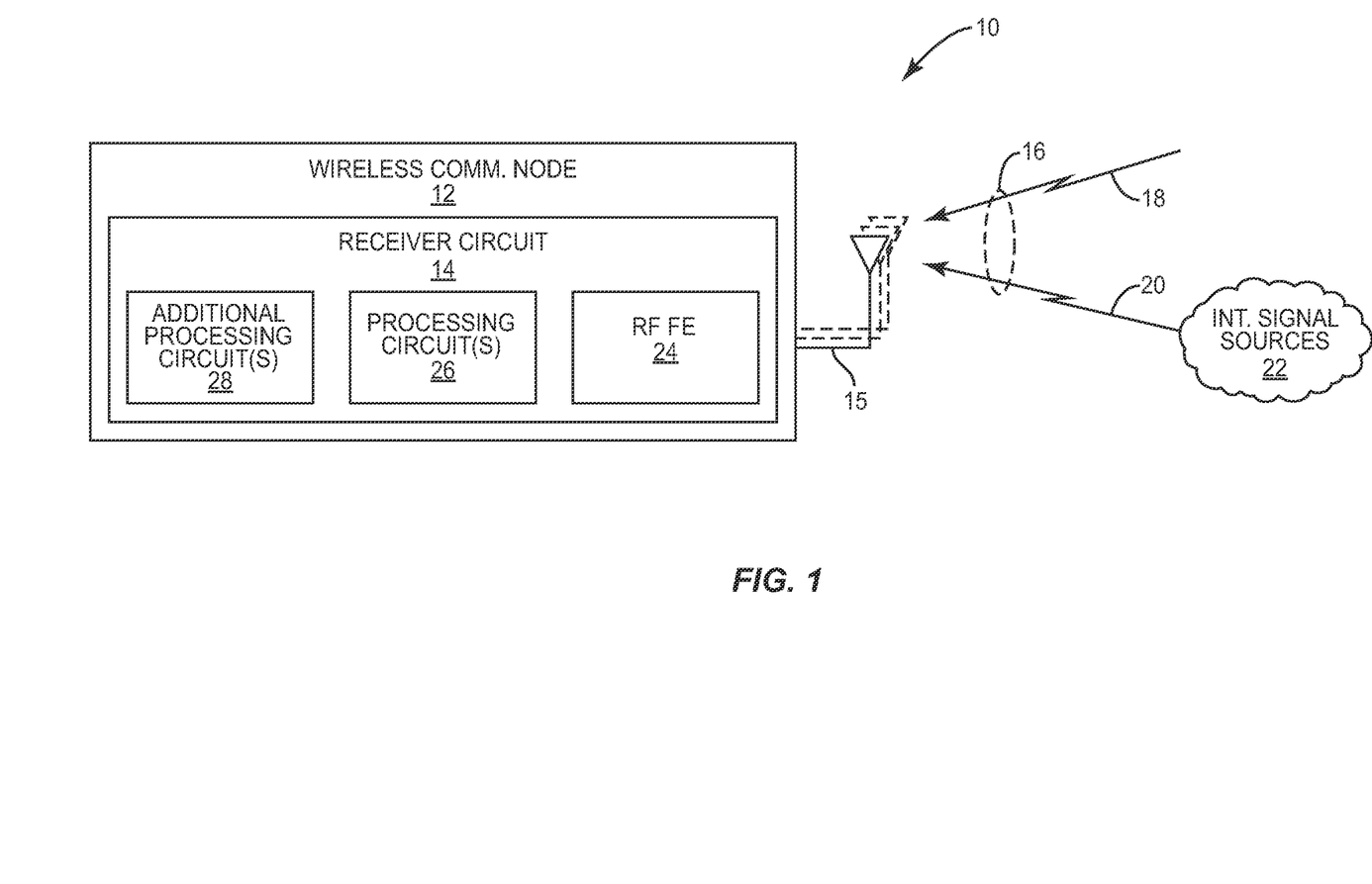
FIG. 1 is a simplified block diagram of a wireless communication network, which may be, according to one or more embodiments taught herein, a CDMA-based network.

FIG. 1 depicts a wireless communication network 10, which includes a wireless communication node 12 configured according to one or more embodiments herein. As one example, the network 10 may comprise a Direct-Sequence (DS) Code Division Multiple Access (CDMA) network, e.g., a Wideband CDMA network, and the node 12 may comprise a DS-CDMA wireless communication device, such as a mobile terminal or user equipment.

Regardless, the wireless communication node 12 comprises a receiver circuit 14 communicatively coupled to one or more antennas 15. Via these antenna(s) 15, the receiver circuit 14 is configured to receive a composite signal 16, which includes an individual signal of interest 18 as well as interfering signals 20 from various interference sources 22. For example, where the node 12 comprises a wireless communication device, the individual signal of interest 18 may be a downlink signal from a cell serving the device, and the interfering signals 20 may be downlink signals from other cells not serving the device. These interfering signals 20 represent impairment in the received signal 16, along with other components of impairment, including self-interference, multiple access interference, noise, and the like.

The receiver circuit 14 is configured to recover and process the individual signal of interest 22 from the received signal 20 to account for this impairment. In this regard, the receiver circuit 14 includes a radio frequency (RF) front end 24, one or more processing circuits 26, and additional processing circuits 28. The RF front end 24 typically includes filters and/or mixers to convert the received signal 16 to baseband, and conversion circuits, such as analog-to-digital converters, to produce a series of digitized baseband samples. The one or more processing circuits 26 then recover and process the individual signal of interest 18 at baseband, such as by performing despreading and impairment suppression in support of signal demodulation. The additional processing circuits 28 further process the signal of interest 18, as necessary, such as by decoding the signal for the recovery of transmitted information.

The generation of combining weights for use in an equalization process to suppress impairment is one aspect of processing performed by the one or more processing circuits 26. The one or more processing circuits 26 generate or otherwise derive these combining weights before despreading (i.e., at the chip-level). In doing so, the one or more processing circuits 26 advantageously exploit an understanding of the ability of the despreading process itself to suppress certain impairment components, but not others. Exploiting this understanding, the one or more processing circuits 26 derive combining weights that do not attempt to suppress impairment components that have been or will be suppressed by the despreading process itself. By distinguishing between impairment components in this way, the one or more processing circuits 26 derive combining weights that use the available degrees of freedom more efficiently. Indeed, combining weights derived at the chip-level in this way will be better able to suppress impairment components not suppressed by the despreading process than combining weights derived at the chip-level without regard to the despreading process.

Figure 2:
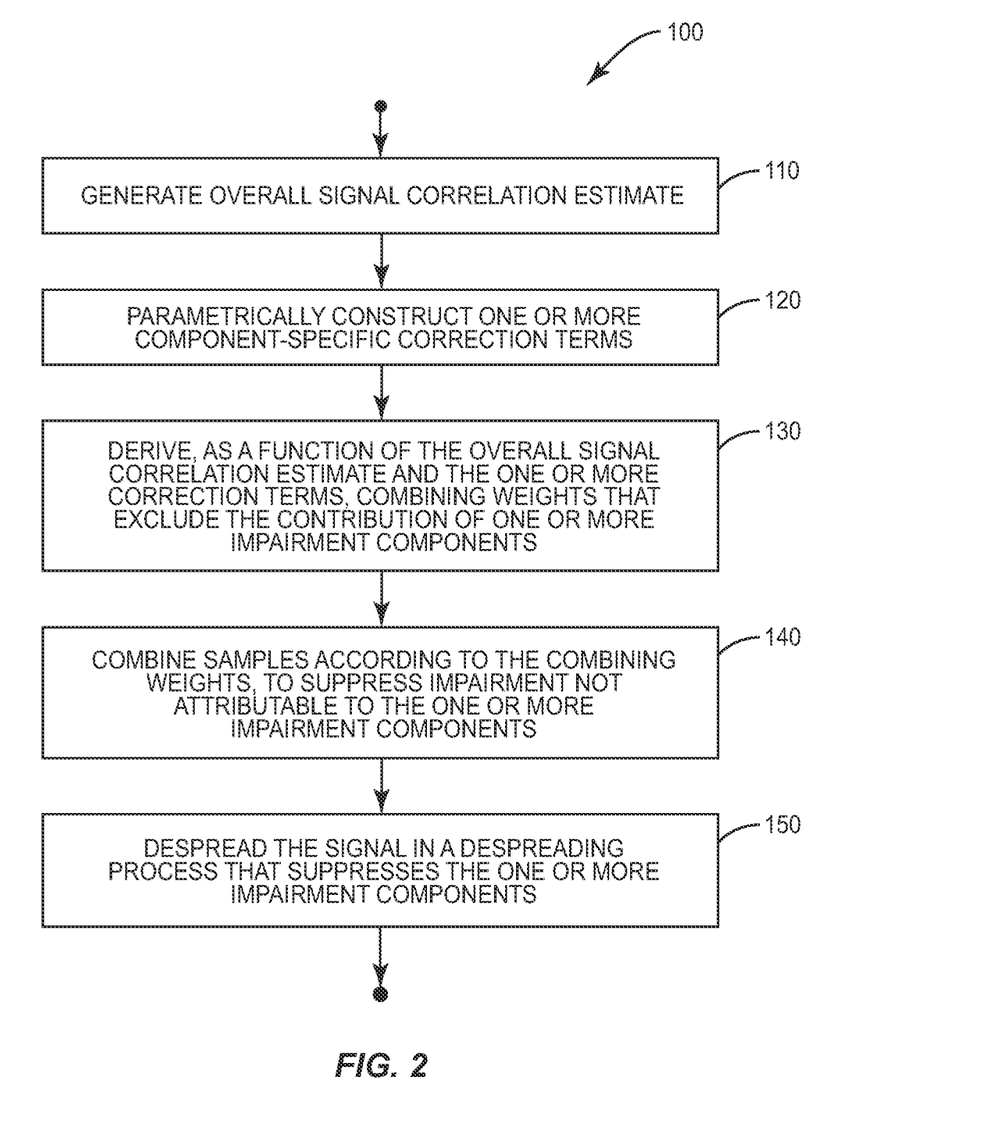
FIG. 2 is a logic flow diagram of processing performed by a wireless communication node in the network shown in FIG. 1 for processing a received communication signal, according to one or more embodiments.

FIG. 2 illustrates processing 100 performed by the one or more processing circuits 26 in this regard. As shown in FIG. 2, such processing 100 includes generating an overall signal correlation estimate that reflects overall impairment present in the received signal 20 before despreading (Block 110). With this estimate generated before despreading, the overall signal correlation estimate thus represents the overall correlations—desired signal and impairment correlations—between chip samples of the received signal 20. The overall impairment as used herein refers to the combined effects of all types or components of impairment in the received signal 20. In any case, processing 100 further includes parametrically constructing one or more component-specific correction terms as a function of one or more component signal correlation estimates (Block 120). Each component signal correlation estimate reflects a particular component of the overall impairment present in the received signal 20 before despreading.

Processing 100 then includes deriving, as a function of the overall signal correlation estimate and the one or more component-specific correction terms, combining weights that exclude the contribution of these one or more impairment components to the overall impairment (Block 130). Samples obtained from the signal 16 (whether chip samples or despread values) are then combined according to these combining weights in a chip-level or symbol-level equalization process (Block 140). As the combining weights exclude the contribution of the one or more impairment components to the overall impairment, the equalization process utilizing the weights exclusively suppresses impairment that is not attributable to those components. This avoids redundant suppression of these impairment components, since processing 100 further includes despreading the received signal 16 in a despreading process that suppresses the components (Block 150). Avoiding redundant impairment suppression in this way advantageously enhances the ability of the equalization process to suppress other impairment components, such as those attributable to other-cell interference.

The illustrated processing should not be construed as defining a limiting sequential order of processing steps, unless noted, nor should the illustrated processing be construed as necessarily representing stand-alone processing performed over a discrete interval of time. Indeed, at least some aspects of the illustrated processing may be performed as part of a larger set of supporting functions, and parts of the illustrated processing may be performed more frequently than others.

Figure 3:
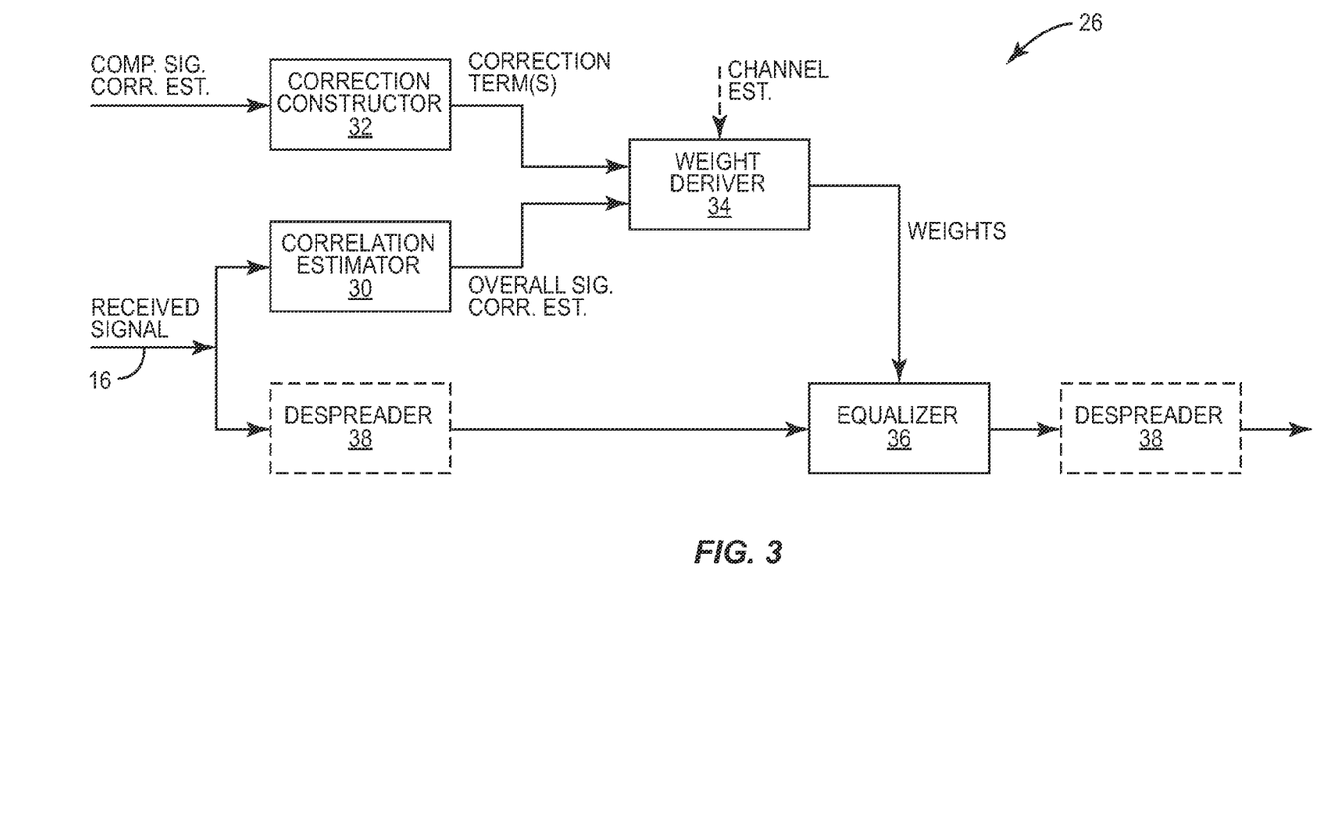
FIG. 3 is a functional block diagram of one or more processing circuits included in a receiver circuit of the wireless communication node of FIG. 2, according to one or more embodiments.

In any case, FIG. 3 illustrates one embodiment of functional circuits implemented by the one or more processing circuits 26 for performing the processing in FIG. 2. The illustrated functional circuits include a correlation estimator 30 configured to generate the overall signal correlation estimate from the received signal 16. (Note that the "received signal" 16 illustrated is a down-converted and sampled (digitized) representation of the antenna-received communication signal 16.) The functional circuits further include a correction constructor 32 configured to parametrically construct the one or more component-specific correction terms from one or more component signal correlation estimates, and a weight deriver 34 configured to derive the combining weights from the overall signal correlation estimate and the one or more correction terms (and one or more channel estimates). An equalizer 36 is then configured to combine signal samples according to those combining weights.

As shown, a despreader 38 may despread the received signal 16 before or after the equalizer 36 combines the signal samples, meaning that the equalizer 36 may functionally implement either a chip-level or symbol-level equalization process. In embodiments where the equalizer 36 implements symbol-level equalization, the equalizer 36 and despreader 38 may functionally form a Generalized Rake (G-Rake) receiver. Such a G-Rate receiver includes a plurality of Rake fingers, each of which operates as a time-aligned correlator that despreads the received signal 16 at an assigned delay offset for a particular CDMA code channel. The finger output signals (despread values) are combined in a combiner, according to the combining weights computed by the weight deriver 34. These weights may be scaled versions of weights computed at the chip-level by the weight deriver 34.

Alternatively, where the equalizer 36 implements chip-level equalization, such as Minimum Mean Square Error (MMSE) chip equalization, the equalizer 36 includes a delay register (e.g., a shift register). This delay register has a series of delay stages through which successive chip samples of the received signal 16 are propagated. Each delay stage provides an output signal (filter tap) and these output signals are combined in a combiner according to the combining weights computed by the weight deriver 34.

In either of the above cases, though, the equalizer 36 refrains from redundantly suppressing impairment components that the despreader 38 itself suppresses. This is because the weight deriver 34 derives equalizer weights that exclude the contribution of those components to overall signal impairment.

In some embodiments, the weight deriver 34 derives such weights by applying the one or more correction terms to the overall signal correlation estimate, and then computing the weights based on that "corrected" correlation estimate. In other embodiments, though, the weight deriver 34 derives the weights by computing initial weights from the overall signal correlation estimate, and then applying the correction terms to those initial weights.

Figure 4:
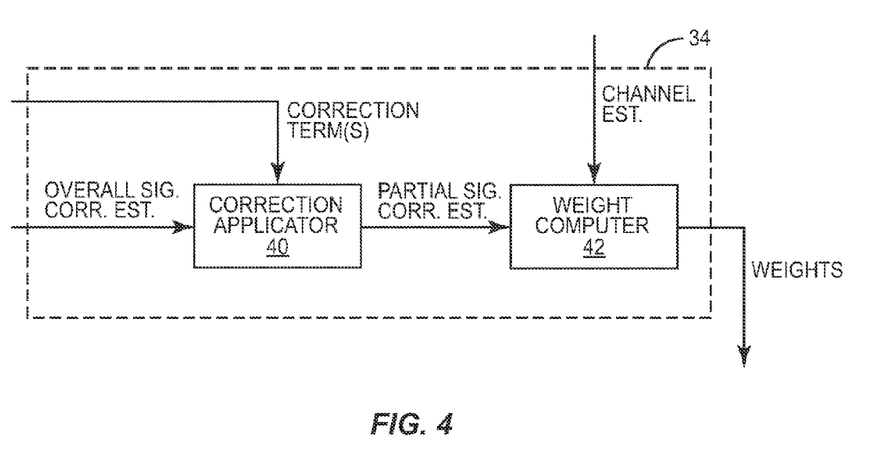
FIG. 4 is a functional block diagram of a weight derivation circuit for deriving combining weights, according to one or more embodiments, by removing one or more correction terms from an overall signal correlation estimate.
Figure 5:
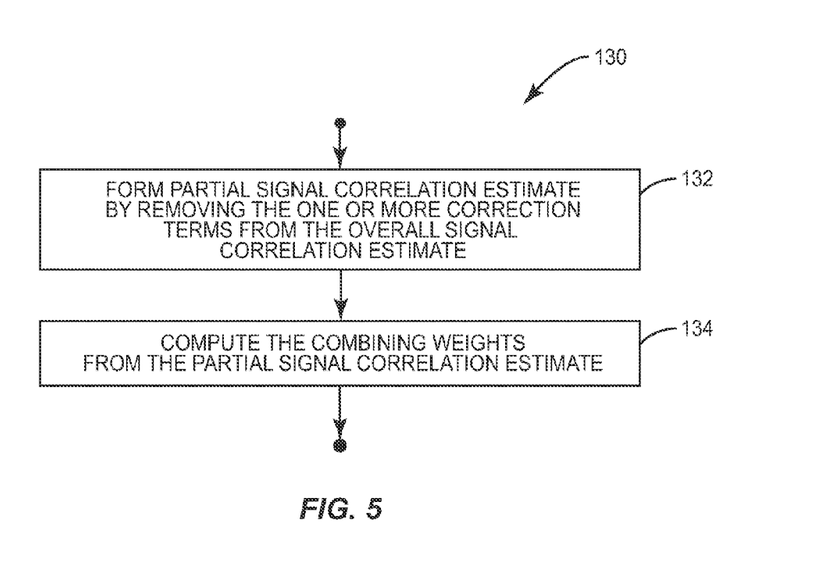
FIG. 5 is a logic flow diagram of processing performed by the weight derivation circuit of FIG. 4.

FIGS. 4 and 5 illustrate additional details of the former embodiments. The weight deriver 34 in these embodiments includes a correction applicator 40 and a weight computer 42, as shown in FIG. 4. The correction applicator 40 receives the one or more correction terms from the correction constructor 32, where the correction terms represent parametrically constructed impairment correlations associated with the particular impairment components that will be removed by the despreading process. The correction applicator 40 applies these terms to the overall signal correlation estimate received from the correlation estimator 30. Such application entails the correction applicator 40 removing the one or more correction terms from the overall signal correlation estimate. Here, the term "removing" connotes an operation, such as subtraction, whereby the correction applicator 40 eliminates (at least substantially) the parametrically constructed impairment correlations represented by the correction terms from the overall impairment correlations. In doing so, the correction applicator 40 forms a partial signal correlation estimate. This partial signal correlation estimate reflects only partial impairment present in the signal 16 before despreading—namely, impairment components other than those which are to be suppressed by the despreading process. The weight computer 42 then computes the weights from the partial signal correlation estimate, rather than from the overall signal correlation estimate as is conventional.

Consider a simple mathematical example for a dispersion-free propagation environment and a single impairment component. In such an example, the weight computer 42 may compute the weights w according to MMSE criteria, as:

$$w = \hat{R}_{partial}^{-1} \hat{h}_j, \quad (1)$$

where $\hat{R}_{partial}$ represents the partial signal correlation estimate output by the correction applicator 40 and $\hat{h}_j$ represents an estimate of the channel associated with a desired signal j to be recovered from the received signal 16. In this case, the correction applicator 40 forms the partial signal correlation estimate as:

$$\hat{R}_{partial} = \hat{R}_{overall} - C, \quad (2)$$

where $\hat{R}_{overall}$ represents the overall signal correlation estimate received from the correlation estimator 30, and C represents a correction term received from the correction constructor 32. A correction term C in these embodiments, as indicated above, represents parametrically constructed impairment correlations associated with a particular impairment component.

The correction constructor 32 correspondingly constructs such a correction term C as a function of a component signal correlation estimate $\hat{R}_i$ that reflects a particular impairment component i. Specifically, the correction constructor 32 parametrically constructs the correction term C according to:

$$C = \hat{\alpha}_i \hat{R}_i, \quad (3)$$

where $\hat{\alpha}_i$ is a component-specific parametric scaling factor configured based on a modeled or otherwise known structure of the impairment component i. Here, the component signal correlation estimate $\hat{R}_i$ is simply equal to $\hat{h}_i \hat{h}_i^H$, where $\hat{h}_i$ represents an estimate of the channel associated with the particular impairment component i.

By computing the weights w as $\hat{R}_{partial}^{-1} \hat{h}_j$ rather than $\hat{R}_{overall}^{-1} \hat{h}_j$ the weight computer 42 enhances the ability of the weights w to suppress other impairment components that contribute to $\hat{R}_{overall}$ as $\hat{R}_{other}$ (where $\hat{R}_{overall} = \hat{R}_j + \hat{\alpha}_i \hat{R}_i + \hat{R}_{other}$).

With an understanding of these details, one may appreciate that the weight deriver 34 in these embodiments generally performs the steps shown in FIG. 5 for implementing the weight derivation processing step 130 in FIG. 2. This processing 130 entails forming a partial signal correlation estimate by removing the one or more correction terms from the overall signal correlation estimate (Block 132). Processing 130 then includes computing the combining weights from the partial signal correlation estimate, rather than from the overall signal correlation estimate (Block 134).

Figure 6:
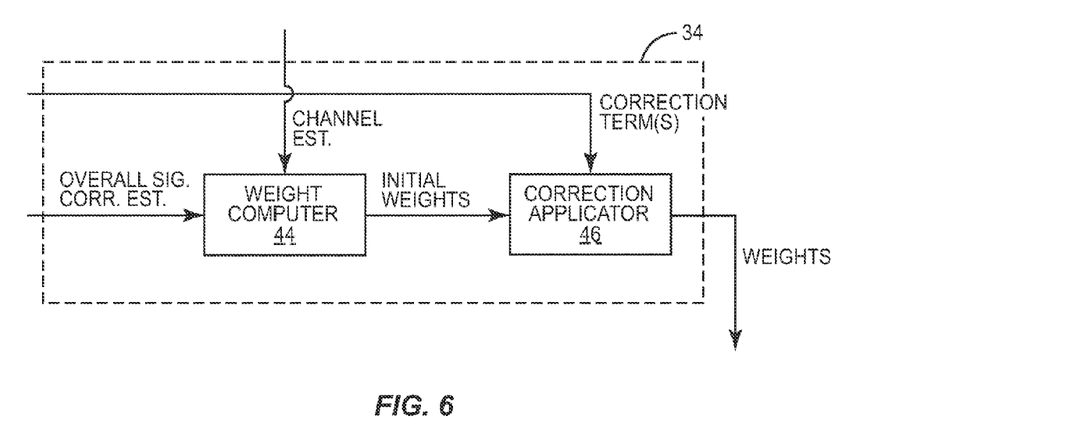
FIG. 6 is a functional block diagram of a weight derivation circuit for deriving combining weights, according to one or more embodiments, by multiplying initial weights by one or more correction terms.
Figure 7:
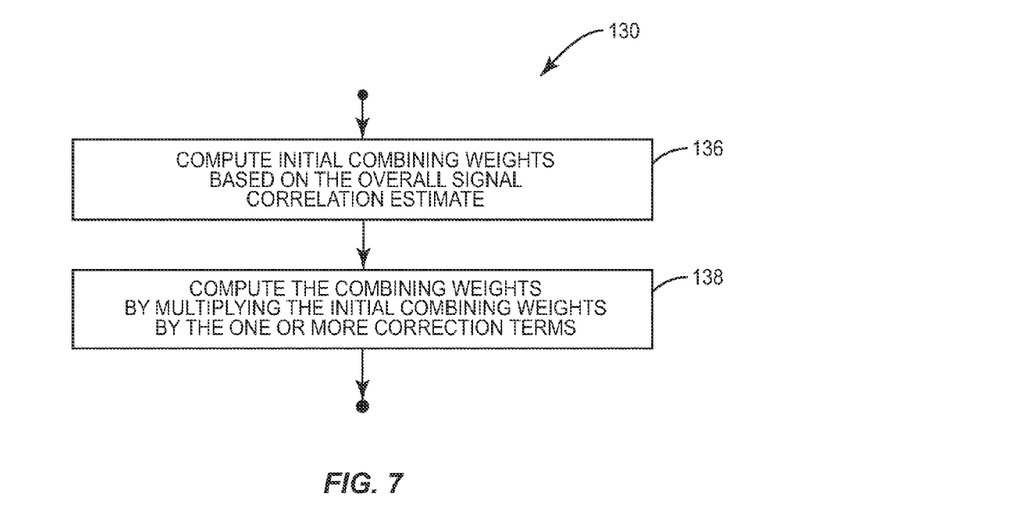
FIG. 7 is a logic flow diagram of processing performed by the weight derivation circuit of FIG. 6.

Turning now to FIGS. 6 and 7, these figures illustrate additional details of latter embodiments where the weight deriver 34 derives the weights in a different way. The weight deriver 34 in these embodiments includes a weight computer 44 and a correction applicator 46 that, as shown in FIG. 6, perform weight computation and correction application in a different order than in previous embodiments. Specifically, the weight computer 44 computes initial weights from the overall signal correlation estimate received from the correlation estimator 30, as is conventional. The correction applicator 46, however, then applies the one or more correction terms received from the correction constructor 32 to the initial weights (e.g., by multiplying the initial weights by those terms) in order to derive the weights utilized by the equalizer 36. Applying the one or more correction terms in this way to the initial weights effectively eliminates (at least substantially) the contribution that the one or more particular impairment components provided to those initial weights. This way, the resulting weights do not attempt to suppress those impairment components.

Consider now a simple mathematical example specific to these embodiments. The weight computer 44 computes the initial weights $w_{initial}$ according to MMSE criteria, as:

$$w_{initial} = \hat{R}_{overall}^{-1} \hat{h}_j, \quad (4)$$

where $\hat{R}_{overall}$ still represents the overall signal correlation estimate received from the correlation estimator 30 and $\hat{h}_j$ still represents an estimate of the channel associated with a desired signal j to be recovered from the received signal 16. In this case, the correction applicator 46 derives the weights w to be used by the equalizer 36 as:

$$w = C w_{initial}, \quad (5)$$

where, again, C represents a correction term received from the correction constructor 32. The correction term C in these embodiments, however, represents a weight adjustment value that functionally 'scales' the initial weights $w_{initial}$ to remove the contribution that a particular impairment component provided to those initial weights $w_{initial}$.

The correction constructor 32 constructs such a correction term C as a function of a component signal correlation estimate $\hat{R}_i$ that reflects a particular impairment component i. More specifically, the correction constructor 32 constructs the correction term C according to:

$$C = \left( I + \frac{\hat{R}_{overall}^{-1} \hat{R}_i}{\frac{1}{\hat{\alpha}_i} + \hat{h}_i^H \hat{R}_{overall}^{-1} \hat{h}_i} \right), \quad (6)$$

where $\alpha_i$ is a component-specific parametric scaling factor configured based on a modeled or otherwise known structure of the impairment component i, $\hat{h}_i$ represents an estimate of the channel associated with the particular impairment component i, $\hat{R}_i$ is equal to $\hat{h}_i \hat{h}_i^H$ as the component signal correlation estimate that reflects the impairment component i, and I is the identity matrix. Note that the component-specific parametric scaling factor $\hat{\alpha}_i$ is obtained by postulating a parametric model of overall signal correlations and then estimating the parameters in the model (including $\hat{\alpha}_i$) by adapting the model to the measured overall signal correlations in a least squares or other fitting process.

Briefly, one can appreciate that the correction term C eliminates the contribution of the particular impairment component i to the initial weights $w_{initial}$ by understanding the relationship between this correction term C and the former embodiments employing the partial signal correlation estimate $\hat{R}_{partial}$. In this regard, combining equations (1), (2), and (3) with the definition of $\hat{R}_i$ as $\hat{h}_i \hat{h}_i^H$, the former embodiments formed weights w utilized by the equalizer 36 as:

$$w = (\hat{R}_{overall} - \hat{\alpha}_i \hat{h}_i \hat{h}_i^H)^{-1} \hat{h}_j \quad (7)$$

After a few mathematical manipulations based on equations (4) and (6), though, one may express these weights w as a function of the initial weights $w_{initial}$ utilized in the latter embodiments (and in conventional equalizers):

$$\begin{aligned}
w &= \left( \hat{R}_{overall}^{-1} + \hat{\alpha}_i \frac{\hat{R}_{overall}^{-1} \hat{h}_i \hat{h}_i^H \hat{R}_{overall}^{-1}}{1 + \hat{\alpha}_i \hat{h}_i^H \hat{R}_{overall}^{-1} \hat{h}_i} \right) \hat{h}_j \quad (8)\\
&= w_{initial} + \frac{\hat{R}_{overall}^{-1} \hat{h}_i \hat{h}_i^H}{\frac{1}{\hat{\alpha}_i} + \hat{h}_i^H \hat{R}_{overall}^{-1} \hat{h}_i} w_{initial}\\
&= \left( I + \frac{\hat{R}_{overall}^{-1} \hat{R}_i}{\frac{1}{\hat{\alpha}_i} + \hat{h}_i^H \hat{R}_{overall}^{-1} \hat{h}_i} \right) w_{initial}\\
&= C w_{initial}
\end{aligned}$$

From equation (8), one can also appreciate that the correction term C can alternatively be expressed as:

$$c = \left( I + \frac{v_i \hat{h}_i^H}{\frac{1}{\hat{\alpha}_i} + v_i^H \hat{h}_i} \right) w_{initial}, \quad (9)$$

where $v_i = \hat{R}_{overall}^{-1} \hat{h}_i$.

With an understanding of these details, one may appreciate that the weight deriver 34 in these embodiments generally performs the steps shown in FIG. 7 for implementing the weight derivation processing step 130 in FIG. 2. This processing 130 entails computing initial combining weights based on the overall signal correlation estimate (Block 136). Processing 130 then includes computing the combining weights utilized by the equalizer 36 by multiplying the initial combining weights by the one or more correction terms (Block 138).

In any case, those skilled in the art will readily appreciate that the simple example above was provided purely for illustrative purposes. Indeed, while the above example focused on only a single impairment component, the embodiments can be readily extended to address multiple impairment components through application of multiple correction terms. In this regard, the multiple correction terms may be computed in a recursive fashion, whereby each correction term is computed as a function of a respective impairment component and a weight solution derived for application of a previously computed correction term.

Similarly, while the above example focused on a dispersion free scenario, the embodiments can be extended to address channel dispersion. In this regard, each impairment component excluded from the combining weights comprises impairment attributable to a main delay of a channel response associated with a particular interfering signal within the received signal 16. Other delays that contribute to multiuser interference (MUI) and inter-symbol interference (ISI) are not excluded from the combining weight solution. Thus, rather than computing a correction term C for a particular impairment component i based on $\hat{h}_i$, which reflects all delays of the associated channel response, extended embodiments herein compute that correction term C based on a more specific $\hat{h}_{i,md}$, which reflects only the main delay of that channel response. This means that, in the different embodiments above, the correction terms shown in equations (3) and (6) respectively become:

$$C = \hat{\alpha}_i \hat{R}_{i,md}, \quad (10)$$

where $\hat{R}_{i,md} = \hat{h}_{i,md} \hat{h}_{i,md}^H$, and $$C = \left(I + \frac{\hat{R}_{overall}^{-1} \hat{R}_{i,md}}{\frac{1}{\hat{\alpha}_i} + \hat{h}_{i,md}^H \hat{R}_{overall}^{-1} \hat{h}_{i,md}}\right). \quad (11)$$

Note that in embodiments further extended to multiple receive antennas 15 M and equalizer processing delays D (i.e., G-Rake fingers or filter taps), the correlation estimates above have dimension MD×MD. Moreover, $\hat{h}_{i,md}$ contains entries from $\hat{h}_i$ in positions corresponding to the D processing delays that are aligned with the main delay, and zeros elsewhere.

Figure 8:
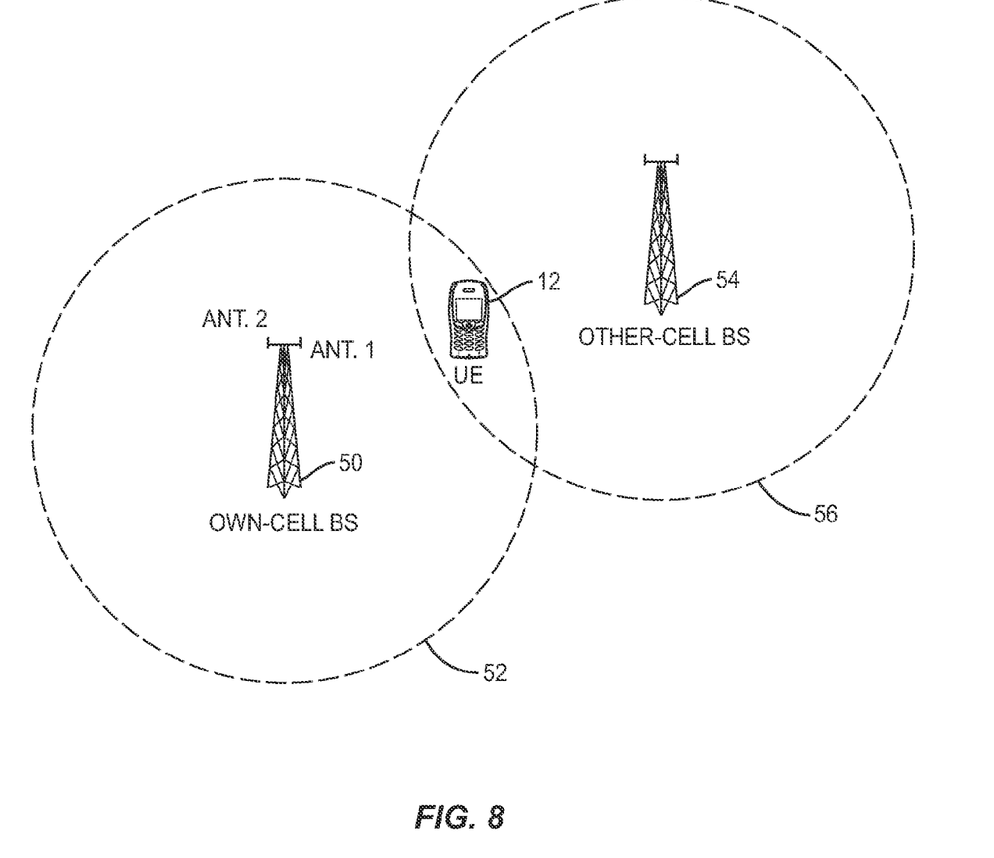
FIG. 8 is a block diagram of a MIMO-deployed cell of an HSDPA network according to one or more embodiments.

Those skilled in the art will also appreciate that the above embodiments have not been described in the context of any particular type of wireless communication network. In this regard, no particular standard is required for practicing the invention. That is, the wireless network 10 may be any one of a number of standardized network implementations that support spread spectrum communications. As one practical example, though, the network 10 may implement High Speed Packet Access (HSPA) standards. In this case, the signal 16 may be a DS-CDMA signal received in a MIMO-deployed cell of an HSPA network, and at least one of the particular impairment components at issue above comprises impairment attributable to a secondary common pilot channel (S-CPICH) transmitted from a secondary antenna of the cell. FIG. 8 illustrates this example in more detail.

As shown in FIG. 8, the wireless communication node 12 is a wireless communication device, termed a user equipment (UE) in HSPA standards. The UE 16 receives the desired signal 18 from a serving base station 60 that provides radio coverage for a serving cell 52, while receiving one or more interfering signals 20 from a non-serving base station 54 that provides radio coverage for another cell 56. As the serving base station 60 has multiple antennas in this MIMO-deployment, a primary antenna and a secondary antenna, the base station 60 transmits a primary common pilot channel (P-CPICH) from the primary antenna and a secondary common pilot channel (S-CPICH) from the secondary antenna. The P-CPICH and the S-CPICH are established within the same channelization code tree (e.g., the same orthogonal variable spreading factor, OVSF, code tree), but experience different instantaneous fading patterns.

Embodiments herein advantageously recognize that, because of this relationship between the P-CPICH and S-CPICH, computing combining weights at the chip-level based on an overall signal correlation estimate would cause the equalization process to suppress the impairment component attributable to the S-CPICH, even though that impairment component would be substantially suppressed by the device's despreading process Indeed, since traffic channels and the S-CPICH are established within the same code tree, despreading the traffic channels will suppress other channels established with an orthogonal code, including the S-CPICH.

The embodiments thereby refrain from redundantly suppressing the S-CPICH in the device's equalization process, by applying a correction term associated with the S-CPICH as described above. As suggested earlier, such a correction term is parametrically constructed as a function of a parametric scaling factor determined based on known transmit power relationships for channels included in the received signal 16. In any event, refraining from suppressing the S-CPICH in the equalization process, enhances the ability of the equalization process to suppress other impairment components, since the equalization need no longer balance the interest of suppressing the S-CPICH with the competing interest of suppressing other impairment components.

In one embodiment, for example, the desired signal 18 received at the device 12 conveys a single data stream from the primary antenna. Reception of this single data stream is interfered with by the S-CPICH received from the secondary antenna and by the one or more interfering signals 20 received from the non-serving base station 54. The embodiment exploits the knowledge that the S-CPICH is suppressed by the despreading process for receiving the single data stream and refrains from suppressing the S-CPICH in the equalization process. This enhances the ability of the equalization process to suppress the one or more interfering signals 20 received from the non-serving base station 54.

Similarly, in another embodiment where the device 12 receives the single data stream over a dispersive channel, reception of the single data stream is interfered with by the S-CPICH received from the secondary antenna and by inter-symbol interference (ISI). The embodiment exploits the knowledge that the main delay associated with the S-CPICH is suppressed by the despreading process for receiving the single data stream and refrains from suppressing that main delay in the equalization process. This enhances the ability of the equalization process to suppress the ISI.

As yet another embodiment, the desired signal 18 received at the device 12 may convey two streams from both antennas. Reception of one stream is interfered with by reception of the other stream, as well as by the S-CPICH received from the secondary antenna and by any common channels. The embodiment exploits the knowledge that the S-CPICH and the common channels are suppressed by the despreading process for receiving one data stream and refrains from suppressing those impairment components in the equalization process for that stream. This enhances the ability of the equalization process to suppress the other data stream. Note that in this embodiment, multiple correction terms are applied, one for each of the S-CPICH and the common channels. This is because the primary antenna, secondary antenna, and the pre-coded MIMO transmissions all have different spatial properties and require different beamforming in the combining weights to suppress.

In view of the above MIMO example, those skilled in the art will appreciate that embodiments herein may be extended to yet other scenarios. As just one example, the embodiments may extend to scenarios where the equalization process is a code-specific process that suppresses specific spreading codes. In this case, at least one of the impairment components discussed above may comprise impairment that is attributable to a specific spreading code.

Those skilled in the art will also appreciate that the various "circuits" described may refer to a combination of analog and digital circuits, and/or one or more processors configured with software stored in memory and/or firmware stored in memory that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method of processing a received communication signal, comprising:
    generating an overall signal correlation estimate that reflects overall impairment present in the signal before despreading;
    parametrically constructing one or more component-specific correction terms as a function of one or more component signal correlation estimates that each reflect a particular impairment component of said overall impairment;
    deriving, as a function of said overall signal correlation estimate and said one or more correction terms, combining weights that exclude the contribution of said one or more impairment components to said overall impairment;
    combining samples obtained from the signal according to the combining weights in a symbol-level or chip-level equalization process, to suppress impairment not attributable to said one or more impairment components; and
    despreading the signal in a despreading process that suppresses said one or more impairment components.

2. The method of claim 1, wherein said deriving comprises:
    forming a partial signal correlation estimate by removing said one or more correction terms from the overall signal correlation estimate; and
    computing the combining weights from the partial signal correlation estimate.

3. The method of claim 1, wherein said deriving comprises:
    computing, based on the overall signal correlation estimate, initial combining weights that account for the contribution of said one or more impairment components to said overall impairment; and
    computing said combining weights by multiplying said initial combining weights by said one or more correction terms.

4. The method of claim 1, wherein said one or more correction terms are parametrically constructed also as a function of a parametric scaling factor determined based on known transmit power relationships for channels included in the received signal.

5. The method of claim 1, wherein at least one of the impairment components comprises impairment attributable to a main delay of a channel response associated with an interfering signal within the received signal.

6. The method of claim 1, wherein the signal is a DS-CDMA signal received in a MIMO-deployed cell of a HSDPA network and wherein at least one of the impairment components comprises impairment attributable to a secondary common pilot channel (S-CPICH) transmitted from a secondary antenna of the cell.

7. The method of claim 6, wherein the received signal includes a single data stream received from a primary antenna of the cell.

8. The method of claim 6, wherein the received signal includes multiple data streams received from multiple antennas of the cell, and wherein at least one of the impairment components comprises impairment attributable to common channels transmitted by said antennas.

9. The method of claim 1, wherein said equalization process is a code-specific process, and wherein at least one of the impairment components comprises impairment attributable to a specific spreading code.

10. A wireless communication node including a receiver circuit for processing a received communication signal, the receiver circuit including one or more processing circuits configured to:
    generate an overall signal correlation estimate that reflects overall impairment present in the signal before despreading;
    parametrically construct one or more component-specific correction terms as a function of one or more component signal correlation estimates that each reflect a particular impairment component of said overall impairment;
    derive, as a function of said overall signal correlation estimate and said one or more correction terms, combining weights that exclude the contribution of said one or more impairment components to said overall impairment;
    combine samples obtained from the signal according to the combining weights in a symbol-level or chip-level equalization process, to suppress impairment not attributable to said one or more impairment components; and
    despread the signal in a despreading process that suppresses said one or more impairment components.

11. The wireless communication node of claim 10, wherein the one or more processing circuits are configured to derive said combining weights by:
    forming a partial signal correlation estimate by removing said one or more correction terms from the overall signal correlation estimate; and
    computing the combining weights from the partial signal correlation estimate.

12. The wireless communication node of claim 10, wherein the one or more processing circuits are configured to derive said combining weights by:
    computing, based on the overall signal correlation estimate, initial combining weights that account for the contribution of said one or more impairment components to said overall impairment; and
    computing said combining weights by scaling said initial combining weights by said one or more correction terms.

13. The wireless communication node of claim 10, wherein said one or more correction terms are parametrically constructed also as a function of a parametric scaling factor determined based on known transmit power relationships for channels included in the received signal.

14. The wireless communication node of claim 10, wherein at least one of the impairment components comprises impairment attributable to a main delay of a channel response associated with an interfering signal within the received signal.

15. The wireless communication node of claim 10, wherein the signal is a DS-CDMA signal received in a MIMO-deployed cell of a HSDPA network and wherein at least one of the impairment components comprises impairment attributable to a secondary common pilot channel (S-CPICH) transmitted from a secondary antenna of the cell.

16. The wireless communication node of claim 15, wherein the received signal includes a single data stream received from a primary antenna of the cell.

17. The wireless communication node of claim 15, wherein the received signal includes multiple data streams received from multiple antennas of the cell, and wherein at least one of the impairment components comprises impairment attributable to common channels transmitted by said antennas.

18. The wireless communication node of claim 10, wherein said equalization process is a code-specific process, and wherein at least one of the impairment components comprises impairment attributable to a specific spreading code.

19. The wireless communication node of claim 10, wherein said node is a wireless terminal.

20. The wireless communication node of claim 10, wherein said node is a base station.

* * * * *